US007015997B2

(12) United States Patent
Choi et al.

(10) Patent No.: US 7,015,997 B2
(45) Date of Patent: Mar. 21, 2006

(54) TRANSFLECTIVE LIQUID CRYSTAL DISPLAY WITH PARTIAL SWITCHING

(75) Inventors: Wing Kit Choi, Orlando, FL (US); Shin-Tson Wu, Oviedo, FL (US)

(73) Assignees: University of Central Florida Research Foundation, Inc., Orlando, FL (US); Toppoly Optoelectronics Corp., (TW)

( * ) Notice: Subject to any disclaimer, the term of this patent is extended or adjusted under 35 U.S.C. 154(b) by 55 days.

(21) Appl. No.: 10/425,582

(22) Filed: Apr. 29, 2003

(65) Prior Publication Data

US 2003/0202139 A1 Oct. 30, 2003

Related U.S. Application Data

(60) Provisional application No. 60/376,670, filed on Apr. 30, 2003.

(51) Int. Cl.
*G02F 1/1335* (2006.01)

(52) U.S. Cl. ........................................ 349/114; 349/141

(58) Field of Classification Search ................ 349/113, 349/114, 141, 143, 75
See application file for complete search history.

(56) References Cited

U.S. PATENT DOCUMENTS

| | | | | |
|---|---|---|---|---|
| 4,256,377 | A | 3/1981 | Krueger et al. | 350/340 |
| 5,113,273 | A | 5/1992 | Mochizuki et al. | 359/56 |
| 5,128,786 | A | 7/1992 | Yanagisawa | 359/67 |
| 5,400,047 | A | 3/1995 | Beesely | 313/503 |
| 5,515,189 | A | 5/1996 | Kuratomi et al. | 359/72 |
| 6,043,605 | A | 3/2000 | Park | 313/586 |
| 6,151,094 | A * | 11/2000 | Wu | 349/181 |
| 6,281,952 | B1 * | 8/2001 | Okamoto et al. | 349/12 |
| 6,344,080 | B1 | 2/2002 | Kim et al. | 106/287.23 |
| 6,650,385 | B1 * | 11/2003 | Liu | 349/113 |
| 6,671,019 | B1 * | 12/2003 | Petschek et al. | 349/129 |
| 2001/0040666 | A1 | 11/2001 | Park | 349/187 |
| 2001/0043297 | A1 | 11/2001 | Arai | 349/114 |

* cited by examiner

*Primary Examiner*—Andrew Schechter
*Assistant Examiner*—Thoi V. Duong
(74) *Attorney, Agent, or Firm*—Brian S. Steinberger; Law Offices of Brian S. Steinberger, P.A.

(57) ABSTRACT

A high reflection and transmission transflective liquid crystal display (TLCD) that requires only a single cell gap. Instead of reducing the cell gap of the R sub-pixel region, the invention reduces the birefringence change Δn of reflective pixels (R) so that the total retardation change Δnd of R is equal to that of the transmissive pixels (T). This is realized by a partial switching of the pixels of approximately 45 degrees which occurs in the reflective pixel (R) region of the single cell gap by applying fringing fields, generated by a discontinuous electrode, to the molecules in the reflective pixel (R) region of the cell gap.

5 Claims, 3 Drawing Sheets

Single Cell Gap
(PRIOR ART)

Double Cell Gap
(PRIOR ART)

(a)

(b)

TRANSFLECTIVE LIQUID CRYSTAL DISPLAY WITH PARTIAL SWITCHING

This invention claims the benefit of priority to U. S. Provisional Patent Application Ser. No. 60/376,670 filed Apr. 30, 2002.

FIELD OF INVENTION

This invention relates to transmission type liquid crystal displays (LCD), and in particular to methods and apparatus for producing transflective liquid crystal displays (TLCD) with partial switching capability.

BACKGROUND AND PRIOR ART

Conventional transmission-type Liquid Crystal Displays (LCDs) exhibit high contrast ratios with good color saturation. However, their power consumption is high due to the need of a backlight. At bright ambient, e.g. outdoor, the display is washed out completely and hence loses its legibility. On the other hand, a reflective LCD uses ambient light for reading out the displayed images and hence retains its legibility under bright ambient. Their power consumption is reduced dramatically due to the lack of a backlight. However, the readability of a reflective LCD is lost under poor ambient light. In addition, its contrast ratio is also lower than that of the transmission-type LCD.

In order to overcome the above inadequacies, transflective LCDs (TLCD) have been developed to allow good legibility under any ambient light environment. In these displays the pixel is divided into R (reflective) and T (transmissive) sub-pixels. The T sub-pixel doesn't have a reflector so that it allows light from backlight to pass through and the device can operate in the transmission mode. Usually, the R and T area ratio is 4:1, in favor of the reflective display. The transmission mode is used for dark ambient only in order to conserve power. In general, there are two main approaches of transflective LCDs (TLCD) that have been developed: single cell gap (FIG. 1*a*) and double cell gap (FIG. 1*b*).

In the single cell gap approach, the cell gap (d) for R and T modes is the same. The cell gap is optimized for R-mode. As a result, the light transmittance for the T mode is generally 50% or lower because the light only passes the LC layer once. In order to achieve high light efficiency for both R and T modes, the double cell gap approach is often used such that the cell gap for the T pixels is twice as large as that for R pixels as shown in FIG. 1*b*. In this case the total length traveled by light in the LC layer is the same for both T and R. This approach however is suitable only for the ECB (Electrically Controlled Birefringence) modes, e.g. Vertical Alignment (VA) and Parallel Alignment (PA) modes.

Single cell gap transflective LCD (TLCD) usually leads to low efficiency for the transmission T. In order to attain high T and R, one often needs to turn to the double cell gap approach. This approach however leads to a much more complicated structure as well as a very demanding fabrication process. The fabrication process needs to have good control over the difference between the two cell gaps, which depends on the control of the extra layer (usually organic). This good control can be difficult which results in non-uniformity in the cell gap and hence deterioration of the LCD optical performance. Moreover, this difference in cell gap between R and T regions also leads to different response times between T and R displays modes.

These difficulties are best illustrated using a transflective LCD (TLCD) with a VA (Vertical alignment) LC mode. For example, if the cell gap(d) is the same for both R and T as shown in FIG. 2*a*, due to the double-path experienced by R, the reflected light R would have experienced a total retardation change of 2.Δn.d which is twice as large as that of T which is Δn.d. Hence the rate of reflection change is twice as fast as that of T, resulting in unequal light level change as shown in FIG. 2*b*. Here R reaches 100% brightness at 2.75V whereas T only reaches 50% at the same voltage. Thus a transflective LCD (TLCD) using this structure would have the on-state voltage, $V_{on}$, at 2.75V which leads to only 50% light efficiency for T.

On the other hand, in the double cell gap approach as shown in FIG. 3*a*, the cell gap in the R region is reduced to d/2 so that the total path length for R (double-path) remains equal to d=(2×d/2) which is the same as that of T. This structure results in equal retardation change and brightness change for both R and T as shown in FIG. 3*b*. Both R and T thus can have high efficiency of 100%.

So far there have been very few approaches that can overcome the problems of the prior art teachings, i.e. to attain high light efficiencies using only a single cell gap. One possibility which was proposed by U.S. Pat. No. 6,281,952 is to use different LC alignments in the R and T regions. This approach is however very difficult to be achieved for mass production using the present LC technology.

A search in the United States Patent Office of the subject matter of this invention (hereafter disclosed) developed the following 7 U.S. patents and 2 published U.S. patent applications:

U.S. Pat. No. 4,256,377 to Krueger, et al is concerned with the development of an alignment for producing vertical alignment which has little to do with partial switching for TLCDs;

U.S. Pat. No. 5,113,273 to Mochizuki, et al is concerned with the improvement of the memory of an electro-optic response of ferroelectric liquid crystals;

U.S. Pat. No. 5,128,786 to Yanagisawa is about Black Matrix used for TFT-LCD devices which is of no relevance to the invention claimed herein;

U.S. Pat. No. 5,400,047 to Beesely is about the improvement of the response time of an electroluminescent display with no discussion of partial switching;

U.S. Pat. No. 5,515,189 to Kuratomi, et al is concerned with LC spatial light modulators for a neural network and not for transflective direct-view displays;

U.S. Pat. No. 6,043,605 to Park improves plasma displays by a floating auxiliary electrode which teaching is not relevant to LCDs;

U.S. Pat. No. 6,344,080 B1 to Kim, et al (as is the foregoing citation) is relevant only to plasma displays;

U.S. Pat. No. Publication 2001/0040666 A1 to Park although it teaches an alignment film for LCDs does not disclose any technique for generating TLCDs; and, U.S. Pat. No. Publication 2001/0043297 A1 to Arai does not involve partial switching and is concerned with Twisted Nematic (TN) and Super Twisted Nematic LCDs.

None of the references developed in the search provided any suggestions for reducing the difficulties faced to attain high light efficiencies using only a single cell gap for its mass production using the present LC technology.

SUMMARY OF THE INVENTION

A primary objective of the invention is to provide high reflection (R) and transmission(T) transflective liquid crystal displays (TLCDs) with a single gap technique without having to use a double cell gap.

A secondary objective of the invention is to provide high reflection (R) and transmission (T) transflective liquid crystal displays (LCDs) having a high performance for displaying high quality images when an ambient light is not bright enough, particularly on color reflective displays.

A third objective of the invention is to provide high reflection (R) and transmission (T) transflective liquid crystal displays (LCDs) having partial switching of molecules within the reflective pixels in a single gap LCD.

In accordance with this invention, there is provided a method of producing high reflection (R) and transmission (T) transflective liquid crystal displays (LCDs) with a single gap comprising the step of reducing the birefringence change Δn of reflective pixels (R) in a single gap liquid crystal display (LCD) so that total retardation Δnd of the reflective pixels (R) is approximately equal to total retardation Δnd of transmissive pixels in said single gap LCD.

Also in accordance with this invention there is provided a single gap, transflective liquid crystal display (TLCD) comprising: a single gap liquid crystal display (LCD) having transmissive pixels (T) and reflective pixels (R); and, means for reducing birefringence change Δn of the reflective pixels (R) in a single gap liquid crystal display (LCD) so that total retardation Δnd of the reflective pixels (R) is approximately equal to total retardation Δnd of transmissive pixels in the single gap LCD.

Further objects and advantages of this invention will be apparent from the following detailed description of a presently preferred embodiment which is illustrated schematically in the accompanying drawings.

DESCRIPTION OF THE PREFERRED EMBODIMENT

Before explaining the disclosed embodiment of the present invention in detail, it is to be understood that the invention is not limited in its application to the details of the particular arrangement shown since the invention is capable of other embodiments. Also, the terminology used herein is for the purpose of description and not of limitation.

In accordance with invention disclosed hereafter, it has been found that instead of reducing the cell gap from d to d/2, one can reduce the birefringence change from Δn to Δn/2 in the R region by the use of partial switching. The molecules are switched by approximately 45° instead of the normal 90°. In this case the resultant retardation change for the double-path R remains at (Δn/2)×(2d)=Δnd, which is the same as that of T. This leads to high light efficiency for both T and R using the simple single cell gap structure.

What follows is a demonstration of a suitable scheme for generating such kind of partial switching. This is achieved by generating a strong fringing field in the R region by using a discontinuous pixel electrode (or common electrode). The scheme and purpose of this fringing field are quite different from the FFS (Fringe-Field-Switching) which is a reported wide-viewing-angle technology for LCDs. The differences are as follows:

a. the FFS scheme requires the common electrode to be on the same side of the substrate as the pixel electrode in order to generate strong in-plane-switching. However, in this invention the common electrode is on the other substrate which has a similar structure as the standard TFT-LCD using normal electric field; and, b. the purpose is not to generate in-plane-switching but instead to deviate the electric field from its normal direction to the oblique direction to generate partial switching.

Thus the fringing field scheme of the invention has both a different structure and purpose compared with the existing FFS TFT-LCDs.

The invention describes a technique for achieving high light efficiency for both R (reflective) and T (transmissive) pixels without using the double cell gap approach. It is based on the fact that the output light level change of a LCD, which is equal to light efficiency in this case, is proportional to the total retardation change experienced by the incident light traveling in the LC layer of the device. The total retardation change Δnd is a product of 1) birefringence change, Δn, 'seen' by the incident light as a result of the reorientation of the liquid crystal molecules upon an applied voltage and 2) total path length traveled by the incident light in the LC layer which d is equal to the cell gap, d, for a single-path light. Instead of reducing the cell gap of the R sub-pixel region, one reduces the birefringence change Δn of R so that the total retardation change Δnd of R is equal to that of T. In this case one can use a single cell gap to achieve both high R and T.

Figure 1A:
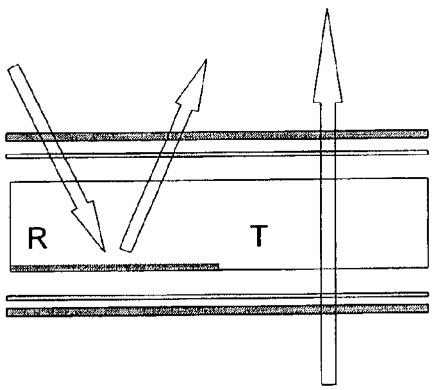
FIG. 1*a* shows a transflective liquid crystal (TLCD) of the prior art using a single cell gap.
Figure 1B:
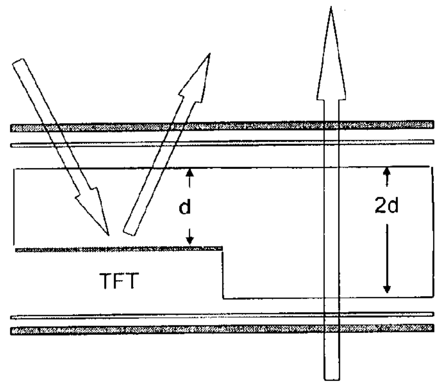
FIG. 1*b* shows a TLCD of the prior art using a double cell gap.
Figure 2A:
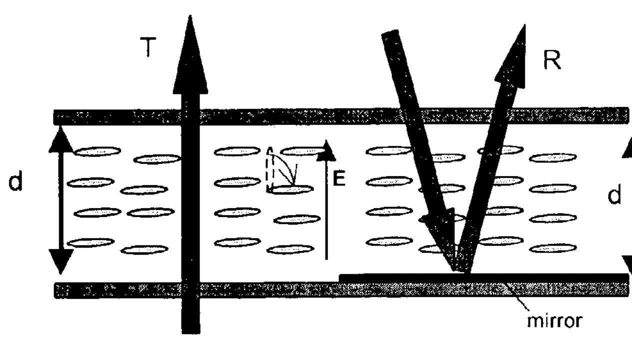
FIG. 2*a* shows the structure of a single cell gap vertically aligned (VA) TLCD pixels showing switching under an applied electric field.
Figure 2B:
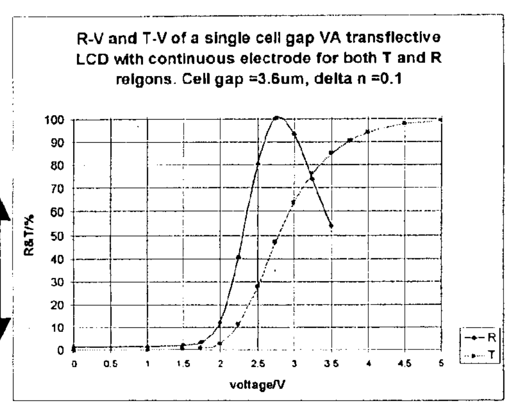
FIG. 2*b* shows plots of the reflection vs. voltage and transmission vs. voltage plots of the device of FIG. 2*a*.
Figure 3A:
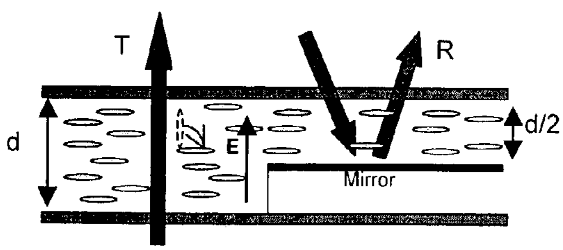
FIG. 3*a* shows the structure of a double cell gap VA TLCD pixels showing switching under an applied electric field.
Figure 3B:
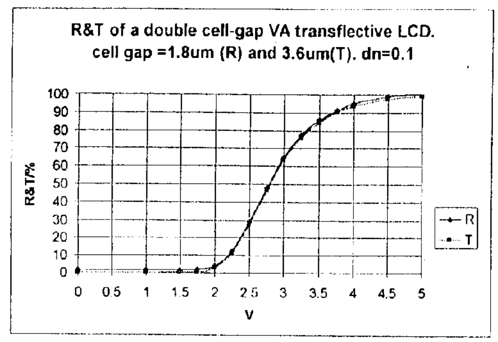
FIG. 3*b* shows plots of the reflection vs. voltage and transmission vs. voltage plots of the device of FIG. 3*a*.
Figure 4:
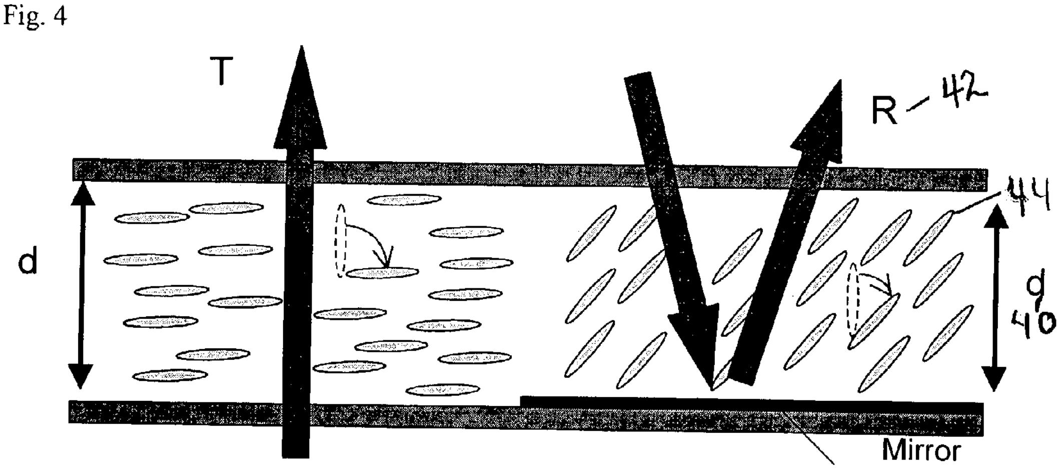
FIG. 4 shows the partial switching scheme of the single gap LCD of the invention.

Reference should now be made to FIG. 4 to best understand the invention. Instead of reducing the cell gap d 40 in the R region 42 to half, the invention reduces the birefringence change Δn in the reflective region to half so that the total retardation remains the same. This can be achieved by partially switching the LC molecules 44. Instead of switching the LC molecules 46 to 90° as would be done by the normal electric field, one partially switches the LC molecules 44 in the R region to approximately 45° as shown in FIG. 4, resulting in a birefringence change of Δn/2 instead of Δn. The total retardation change for R thus remains at Δn.d (=Δn/2×2d) since the total path for R in the LC layer is 2d. Both T and R are expected to give almost equal and high efficiency under this condition.

Figure 5:
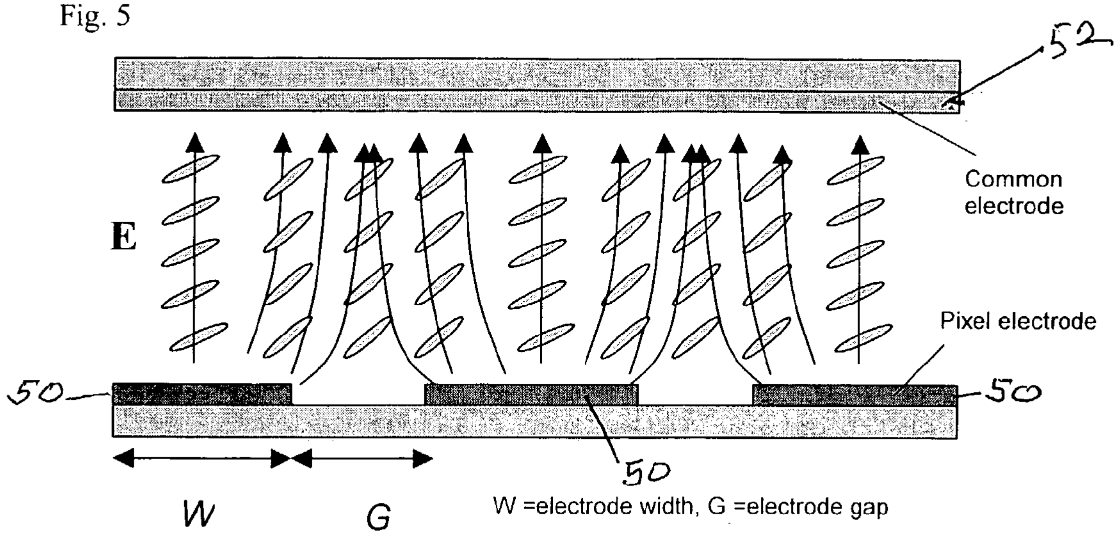
FIG. 5 shows the generation of strong fringing fields using the discontinuous electrode in the single gap LCD of the invention.

A method for partial switching is to use an oblique electric field. Through computer simulations, a method for generating a suitable oblique electric field to achieve the required partial switching is by generating the fringing field between a discontinuous pixel electrode 50 and common electrode 52 as shown in FIG. 5. The discontinuous electrode 50 needs to have narrow width W (Typically<approximately 10 μm) and narrow gap G (typically<approximately 3 μm), so that the fringing field dominates. This causes the LC molecules in and near the gap region to switch partially and hence reduce the resultant single-path retardation change. The discontinuous electrode can be fabricated on top of the reflector with a thin layer of insulating layer (e.g. $SiO_2$) between them. Alternatively, the discontinuous electrode can also be fabricated using the common electrode on the color filter substrate instead of the pixel electrode on the reflector substrate. In this case, no additional insulating layer or modification is required on the reflector.

Figure 6:
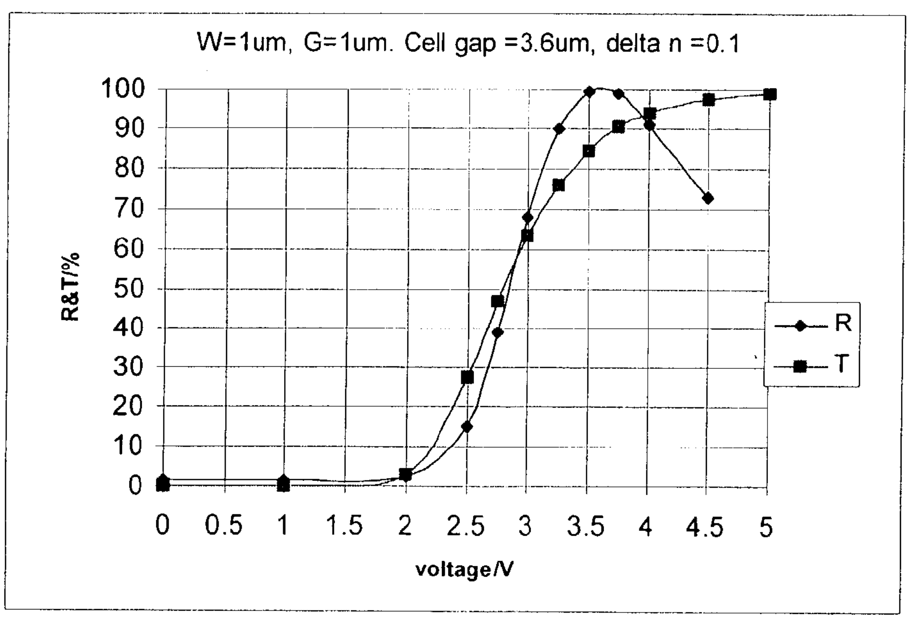
FIG. 6 shows reflective voltage (R-V) and transmission voltage (T-V) plots of a single cell gap VA TLCD with partial switching in the R sub-pixel region.

As an example, FIG. 6 shows the light efficiency of R and T as a function of voltage for a VA transflective device with a discontinuous electrode of approximately 1 μm width and approximately 1 μm gap in the R region. The electrode in the T region remains continuous. As can be seen, the light efficiency for R reaches 100% at approximately 3.75V. If one biases the device at this voltage for the on-state ($V_{on}$), efficiency for T is approximately 90% which is much higher than that of a single cell gap device without discontinuous electrode. The efficiency of T is not 100% since the partial switching in R in this case is not ideal, i.e. the molecules are not all switched to 45° at the voltage as the molecules in T switched to 90°. However, by proper design, the efficiencies can be optimized. Although the electrode width W and electrode gap G are best kept below or equal to approximately 10 μm and approximately 3 μm, respectively, to ensure a strong fringing field, the actual limits depend on the cell gap of the device. The higher the cell gap, the wider the electrode width and gap are permitted since the fringe field can extend to a wider region. Therefore the amount of partial switching can remain more or less the same despite of the larger electrode width and gap.

Table 1 shows examples of the results obtained using different combinations of electrode width and electrode gap. The results illustrate that the principle of partial switching can indeed be a very novel and simple approach to attaining high R and T efficiencies for a single cell gap TLCD without using the complicated double cell gap approach.

TABLE 1

| Width (W)/μm | Gap (G)/μm | Von/V | R/% | T/% |
|---|---|---|---|---|
| 1 | 1 | 3.6 | 100 | 87 |
| 1 | 1.5 | 4 | 94 | 94 |
| 1 | 2 | 4.5 | 88 | 98 |
| 2 | 1 | 3.25 | 100 | 76 |
| 2 | 2 | 3.75 | 87 | 90 |
| 3 | 1 | 3.15 | 100 | 73 |
| 3 | 2 | 3.75 | 85 | 90 |
| 4 | 1.5 | 3.5 | 92 | 85 |
| 4 | 1.75 | 3.5 | 88 | 85 |
| 4 | 2 | 3.75 | 84 | 90 |
| 5 | 1.75 | 3.5 | 85 | 85 |
| 5 | 2 | 3.75 | 82 | 90 |
| 10 | 3 | 2.85 | 90 | 86 |

As noted above, light efficiencies R and T were obtained and reported in Table 1 using different combinations of electrode width W and electrode gap G. The results illustrate that R and T>85% can be achieved steadily using this inventive partial switching scheme. It also shows that, in some cases, electrode Gap G cannot be too small.

The reported results illustrate that the principle of partial switching can indeed be a very novel and simple approach to attaining high R and T efficiencies for a single cell gap TLCD. Moreover, the light efficiencies of both R and T can be improved further by increasing the cell gap since the amount of partial switching increases as cell gap increases. Most of the results in Table 1 are based on a cell gap of approximately 3.6 μm as an example.

This invention discloses a very novel and simple technique of achieving high Reflection and Transmission TLCDs without using the double cell gap approach. The invention is based on the surprising fact that, instead of reducing the cell gap from d to d/2, it is possible to reduce the birefringence change from Δn to Δn/2 in the R region by the use of partial switching. The molecules are switched by approximately 45° instead of the normal 90°. In this case the resultant retardation change for the double-path R remains at $(\Delta n/2)\times(2d)=\Delta nd$, which is the same as that of T. This leads to high light efficiency for both T and R using the simple single cell gap structure.

There has been demonstrated a suitable scheme for generating such kind of partial switching. This is achieved by generating a strong fringing field in the R region by using discontinuous pixel electrode (or common electrode). The scheme and purpose of this fringing field are quite different from the FFS (Fringe-Field-Switching) which is a reported wide-viewing-angle technology for LCDs. The differences are as follows:

(a) the FFS scheme requires the common electrode to be on the same side of the substrate as the pixel electrode in order to generate strong in-plane-switching. However, in this invention, the common electrode is on the other substrate which has a similar structure as the standard TFT-LCD using normal electric field; and, (b) the purpose of the invention is not to generate in-plane-switching but instead deviate the electric field from the normal direction to the oblique direction to generate partial switching with an fringing field scheme of different structure and purpose compared with the existing FFS TFT-LCDs.

The invention avoids the need of using the double cell gap approach to achieve high light efficiency for both R and T. As described before, the double cell gap approach leads to a much more complicated structure as well as demanding fabrication process. The fabrication process needs to have very good control over the difference between the two cell gaps, which depends on the control of the extra layer (usually organic). This good control can be difficult which results in non-uniformity in the cell gap and hence deterioration of the LCD optical performance.

Unlike the double cell gap approach, this single cell gap leads to no difference in response time between T and R displays modes.

The invention can also save costs since this scheme doesn't require a major extra component to form the discontinuous electrode instead of the normal continuous electrode in the R region. In the case of double cell gap, it requires an extra thick organic layer to form the double cell gap structure.

The invention has applications for handheld and mobile communications such as but not limited to mobile telephones, personal digital assistants (PDA), e-books, and the like.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A method of producing high reflection (R) and transmission (T) transflective liquid crystal displays (LCDs) with a single gap, comprising the step of:

providing a single gap liquid crystal display (LCD) having a licquid crystal layer between a discontinuous pixel electrode and a common electrode, the liquid crystal layer having a cell gap thickness d that is approximately identical throughout the single cell gap liquid crystal display;

reducing the birefringence change Δn of reflective pixels (R) in the single gap liquid crystal display (LCD) by approximately ½ by partially switching molecules in the reflective pixels (R) approximately 45 degrees so that total retardation Δnd of the reflective pixels (R) is approximately equal to total retardation Δnd of transmissive pixels in the single gap LCD; and applying an electric field between the discontinuous pixel electrode and the common electrode to generate a fringing field in the reflective pixels (R) to partially switch the liquid crystal molecules to said approximately 45 degrees to achieve said total retardation Δnd in the reflective pixels (R), wherein said total retardation Δnd is achieved without the use of compensators, polarizers and alignment films for obtaining the approximately 45 degree reorientation of the liquid crystal molecules.

2. The method of claim 1, wherein the discontinuous pixel electrode includes:

a narrow width of less than approximately 10 μm; and a narrow gap of less than approximately 3 μm.

3. The method of claim 1, further comprising the step of:

increasing width and gap spacing limits in the discontinuous electrode as the cell gap size increases.

4. A high reflection (R) and transmission (T) transflective liquid crystal display (TLCD), comprising:

a single gap liquid crystal display (LCD) having transmissive pixels (T) and reflective pixels (R) in a transmissive region and a reflective region that has a mirror-reflector with a thickness, the single gap liquid crystal display having a liquid crystal layer thickness between a discontinuous reflective pixel electrode and a common electrode that remains identical in both the transmissive region and the reflective region when taking into account the thickness of the mirror-reflector in the reflective region; and, means for applying an electric field between the discontinuous pixel electrode and the common electrode to generate a fringing field in the reflective pixels (R) to partially switch the liquid crystal molecules to approximately 45 degrees in the reflective region to reduce the birefringence change Δn of reflective pixels (R) in a single gap liquid crystal display (LCD) to approximately Δn/2 without reducing the cell gap d so that total retardation Δnd of the reflective pixels (R) is approximately equal to the total retardation Δnd of the transmissive pixels in the single gap LCD, wherein said total retardation Δnd is achieved without the use compensators, polarizers and alignment films for obtaining the approximately 45 degree reorientation of the liquid crystal molecules.

5. The LCD of claim 4, wherein the discontinuous pixel electrode includes:

a narrow width of less than approximately 10 μm; and a narrow gap of less than approximately 3 μm.

* * * * *